United States Patent
Green et al.

(10) Patent No.: US 10,530,762 B2
(45) Date of Patent: Jan. 7, 2020

(54) ELECTING WHETHER TO UNIFY PASSCODES

(71) Applicant: Google LLC, Mountain View, CA (US)

(72) Inventors: Timothy William Green, London (GB); Paul Dermot Crowley, Sunnyvale, CA (US); Lilian Zia, Sunnyvale, CA (US); Clara Bayarri Romana, London (GB)

(73) Assignee: Google LLC, Mountain View, CA (US)

( * ) Notice: Subject to any disclaimer, the term of this patent is extended or adjusted under 35 U.S.C. 154(b) by 125 days.

(21) Appl. No.: 15/156,415

(22) Filed: May 17, 2016

(65) Prior Publication Data

US 2017/0264605 A1    Sep. 14, 2017

Related U.S. Application Data

(60) Provisional application No. 62/305,994, filed on Mar. 9, 2016.

(51) Int. Cl.
*H04L 9/00*    (2006.01)
*G06F 21/00*   (2013.01)
(Continued)

(52) U.S. Cl.
CPC .......... *H04L 63/0815* (2013.01); *G06F 21/41* (2013.01); *G06F 21/44* (2013.01)

(58) Field of Classification Search
CPC ................................................ H04L 63/0815
See application file for complete search history.

(56) References Cited

U.S. PATENT DOCUMENTS 9,424,416 B1 *  8/2016  Choudhary ............. G06F 21/44
2006/0075224 A1  4/2006  Tao
(Continued)

FOREIGN PATENT DOCUMENTS

CN    103064622    4/2013
CN    104573485    4/2015

OTHER PUBLICATIONS

"AirWatch Container Management," VMware, accessed on Mar. 8, 2016, URL<http://www.air-watch.com/solutions/container/>, 4 pages.
(Continued)

*Primary Examiner* — Alexander Lagor
*Assistant Examiner* — Syed M Ahsan
(74) *Attorney, Agent, or Firm* — Fish & Richardson P.C.

(57) ABSTRACT

Methods, systems, and apparatus, including computer programs encoded on computer storage media, for creating a unified passcode. One of the methods includes identifying that an application program installed on the system is assigned to a profile for an organization, identifying that the profile requires a passcode to allow access to the application program, providing a user interface with which user input is able to specify whether the system should use separate passcodes to unlock the system and provide access to the application program, receiving first user input that specifies that the system is to use a single passcode to both unlock the system and provide access to the application program, receiving, while the system is locked, second user input that specifies the single passcode, unlocking the system, receiving user input that selects a user interface element to activate the application program, and activating the application program without requesting a passcode.

16 Claims, 10 Drawing Sheets

(51) Int. Cl.
*H04L 29/06* (2006.01)
*G06F 21/41* (2013.01)
*G06F 21/44* (2013.01)

(56) References Cited

U.S. PATENT DOCUMENTS

| | | | |
|---|---|---|---|
| 2013/0219346 A1 | 8/2013 | LeBeau et al. | |
| 2014/0215555 A1 | 7/2014 | Barton et al. | |
| 2014/0281562 A1* | 9/2014 | Kespohl | G06F 21/31 713/184 |
| 2015/0074615 A1* | 3/2015 | Han | G06K 9/00033 715/863 |
| 2015/0347730 A1* | 12/2015 | Matus | G06F 21/32 726/19 |
| 2015/0358331 A1* | 12/2015 | Rachalwar | H04L 63/105 726/7 |
| 2016/0142418 A1* | 5/2016 | Barton | H04L 63/10 726/4 |
| 2016/0330241 A1* | 11/2016 | Olivera | H04L 63/20 |

OTHER PUBLICATIONS

"Android for Work Security white paper," Google for Work, May 2015, URL<https://static.googleusercontent.com/media/www.google.com/en/US/work/android/files/android-for-work-security-white-paper.pdf> 18 pages.

"MaaS360® Mobile Application Management," MaaS360 by Fiberlink, an IBM company, accessed on Mar. 8, 2016, 2 pages.

"Mobile App Containerization," Good, powered by BlackBerry, accessed on Mar. 8, 2016, URL<https://www1.good.com/secure-mobility-solution/mobile-application-containerization>, 6 pages.

"Samsung and Google deliver the most secure android solution," Inforgraphic Poster, Sep. 2015, 1 page.

"Samsung KNOX, the best available security experience," Inforgraphic Workspace, Sep. 2015, 1 page.

MobileIron, "Mobile Application Management (MAM)," accessed on Mar. 8, 2016, URL<https://www.mobileiron.com/en/solutions/mobile-application-management-mam>, 7 pages.

Samsung Business, "Samsung KNOX," Brochure, accessed on Mar. 8, 2016, 6 pages.

Samsung, "Samsung KNOX," accessed on Mar. 8, 2016, URL<http://www.samsung.com/us/business/security/knox/>, 8 pages.

International Search Report and Written Opinion in International Application No. PCT/US2016/063825, dated Feb. 9, 2017, 10 pages.

International Preliminary Report on Patentability issued in International Application No. PCT/US2016/063825, dated Sep. 20, 2018, 7 pages.

CN Office Action in Chinese Appln. 201611236841.8, dated Aug. 1, 2019, 20 pages (with English translation).

\* cited by examiner

US 10,530,762 B2

ELECTING WHETHER TO UNIFY PASSCODES

CROSS-REFERENCE TO RELATED APPLICATION

This application claims the benefit of U.S. Provisional Application No. 62/305,994, filed Mar. 9, 2016, the contents of which are incorporated by reference herein.

TECHNICAL FIELD

This document generally relates to electing whether to unify passcodes.

BACKGROUND

A computing device may require entry of a passcode, e.g., a password or fingerprint data, to provide access to data stored on the computing device. When the computing device is locked and receives user input requesting access to the data, the computing device provides a user interface requesting user input of the passcode. Once the computing device receives the user input, the computing device compares the user input with a stored passcode to determine whether the user input matches the stored passcode.

The computing device may encrypt the stored passcode to prevent unauthorized access to the stored passcode. For instance, the computing device may apply a hash to a passcode and store the hashed passcode. When the computing device receives user input through the user interface, the computing device applies the same hash to the user input and compares the hashed user input with the hashed passcode to determine whether to provide access to the computing device.

SUMMARY

This document describes techniques, methods, systems, and other mechanisms for electing to unify passwords. Embodiment 1 is a method comprising: identifying, by a computing device, that an application program installed on the computing device is assigned to a profile for an organization, identifying, by the computing device, that the profile for the organization requires a passcode to allow access to the application program, providing, by the computing device as a result of having identified that the profile for the organization requires the passcode to allow access to the application program, a user interface with which user input is able to specify whether the computing device should use separate passcodes to unlock the computing device and provide access to the application program, receiving, by the computing device and as a result of providing the user interface, first user input that specifies that the computing device is to use a single passcode to both unlock the computing device and provide access to the application program, receiving, by the computing device, after the first user input has specified that the computing device is to use a single passcode and while the computing device is locked, second user input that specifies the single passcode to both unlock the computing device and provide access to the application program, and as a result, unlocking the computing device, and receiving, by the computing device and after the computing device has unlocked, user input that selects a user interface element to activate the application program, and as a result, activating the application program without requesting that user input provide a passcode.

Embodiment 2 is the method of embodiment 1, comprising: identifying, by the computing device, that a setting of the computing device specifies that the computing device is to use separate passcodes to unlock the computing device and access the application program, providing, by the computing device and while the computing device is locked and while the setting of the computing device specifies that the computing device is to use separate passcodes to unlock the computing device and provide access to the application program, a first unlock user interface, receiving, by the computing device through the first unlock user interface, third user input that specifies an unlock passcode for the computing device, and as a result, unlocking the computing device, receiving, by the computing device and while the computing device is unlocked, fourth user input that selects the user interface element to activate the application program, providing, by the computing device in response to the fourth user input that requests presentation of the user interface for the application program, a second unlock user interface, receiving, by the computing device through the second unlock user interface, fifth user input that specifies an organization passcode used to access the application program, and activating, by the computing device in response to receiving the fifth user input that specifies the organization passcode used to access the application program, the application program.

Embodiment 3 is the method of embodiments 1 or 2, wherein: receiving the third user input that specifies the unlock passcode for the computing device comprises receiving the third user input that specifies the unlock passcode for the computing device that complies with first passcode restrictions, and receiving the fifth user input that specifies an organization passcode used to access the application program comprises receiving the fifth user input that specifies an organization passcode used to access the application program that complies with second passcode restrictions specified in the profile for the organization, the second passcode restrictions being different passcode restrictions than the first passcode restrictions.

Embodiment 4 is the method of embodiments 1 through 3, comprising: receiving, by the computing device, sixth user input that specifies a new organization passcode, determining, by the computing device and using the sixth user input, whether the new organization passcode complies with passcode restrictions defined in the profile for the organization, and providing, by the computing device and in response to determining that the new organization passcode complies with the passcode restrictions defined in the profile for the organization, the user interface with which user input is able to specify whether the computing device should use separate passcodes to unlock the computing device and provide access to the application program.

Embodiment 5 is the method of embodiments 1 through 4, comprising: providing, by the computing device in response to receiving the fifth user input that specifies the organization passcode used to access the application program, access to the application program and all other application programs assigned to the profile for the organization, including at least one other application program that is assigned to the profile for the organization.

Embodiment 6 is the method of embodiments 1 through 5, comprising: determining, by the computing device while the setting of the computing device specifies that the computing device is to use separate passcodes to unlock the computing device and provide access to the application program and in response to receiving the third user input that specifies the unlock passcode for the computing device, that the computing device uses separate passcodes to unlock the computing device and provide access to the application program, and preventing, by the computing device until receipt of user input that specifies the organization passcode, access to all application programs assigned to the profile for the organization including the application program.

Embodiment 7 is the method of embodiments 1 through 6, wherein providing, by the computing device in response to the fourth user input that requests presentation of the user interface for the application program, the second unlock user interface comprises providing, by the computing device in response to the fourth user input that requests presentation of the user interface for the application program, the second unlock user interface that is a different user interface than the first unlock user interface.

Embodiment 8 is the method of embodiments 1 through 7, wherein providing, by the computing device in response to the fourth user input that requests presentation of the user interface for the application program, the second unlock user interface that is a different user interface than the first unlock user interface comprises providing the second user interface with an image therein that is specified by the organization or an administrator thereof.

Embodiment 9 is the method of embodiments 1 through 8, comprising: receiving, by the computing device, instructions to prevent access to the application program and any other application programs assigned to the profile for the organization, the instructions received in response to a predetermined quantity of failed attempts to enter a passcode for access to the application program or in response to administrator input to prevent access to the application program, and preventing, by the computing device and in response to receiving the instructions to prevent access to the application program and any other application programs assigned to the profile for the organization, presentation of a user interface for the application program.

Embodiment 10 is the method of embodiments 1 through 9, comprising: receiving, by the computing device, third user input requesting access to the application program after receiving the instructions to prevent access to the application program and any other application programs assigned to the profile for the organization, and determining, by the computing device and in response to the third user input requesting access to the application program, not to provide access to the application program.

Embodiment 11 is the method of embodiments 1 through 10, comprising: identifying, by the computing device, that a setting of the computing device specifies that the computing device is to use separate passcodes to unlock the computing device and access the application program, receiving, by the computing device and while the computing device is locked and while the setting of the computing device specifies that the computing device is to use separate passcodes to unlock the computing device and provide access to the application program, a first email message for a first email account that is not managed by the organization, providing, by the computing device and while the computing device is locked, information about the first email message in a locked user interface for the computing device, receiving, by the computing device and while the computing device is locked and has separate passcodes to unlock the computing device and provide access to the application program, a second email message for a second email account that is managed by the organization, and determining, by the computing device and while the computing device is locked and using the profile for the organization, not to providing information about the second email message in the locked user interface for the computing device.

Embodiment 12 is the method of embodiments 1 through 11, comprising: determining, by the computing device, that hardware of the computing device allows the use of separate passcodes to unlock the computing device and provide access to the application program, wherein providing the user interface with which user input is able to specify whether the computing device should use separate passcodes to unlock the computing device and provide access to the application program in responsive to determining that hardware of the computing device allows the use of separate passcodes to unlock the computing device and provide access to the application program.

Embodiment 13 is the method of embodiments 1 through 12, wherein determining, by the computing device, that hardware of the computing device allows the use of separate passcodes to unlock the computing device and provide access to the application program comprises determining that the computing device permits use of file-based encryption.

Embodiment 14 is the method of embodiments 1 through 13, comprising: determining, by the computing device in response to receiving the second user input that specifies the single passcode, that the second user input specifies the single passcode, and providing, by the computing device in response to determining that the second user input specifies the single passcode, access to the application program and an additional application without requiring an additional passcode, the additional program being a program that is not assigned to the profile for the organization and that is accessible when the computing device is unlocked.

Embodiment 15 is directed to a one or more computer-readable devices having instructions stored thereon, that when executed by one or more processors, cause the performance of actions according to the method of any one of embodiments 1 through 14.

Particular implementations can, in certain instances, realize one or more of the following advantages. In some implementations, the systems described below may allow the system to receive user input specifying whether to have a single passcode or multiple passcodes to access different application programs that can be assigned to different device profiles. For instance, a system may use an organization profile to manage one or more application programs and determine whether the organization profile should apply to all application programs on the device (e.g., when the system has a single unified passcode) or only those specific to the organization profile (e.g., which allow access to data for the organization when the system has multiple passcodes).

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
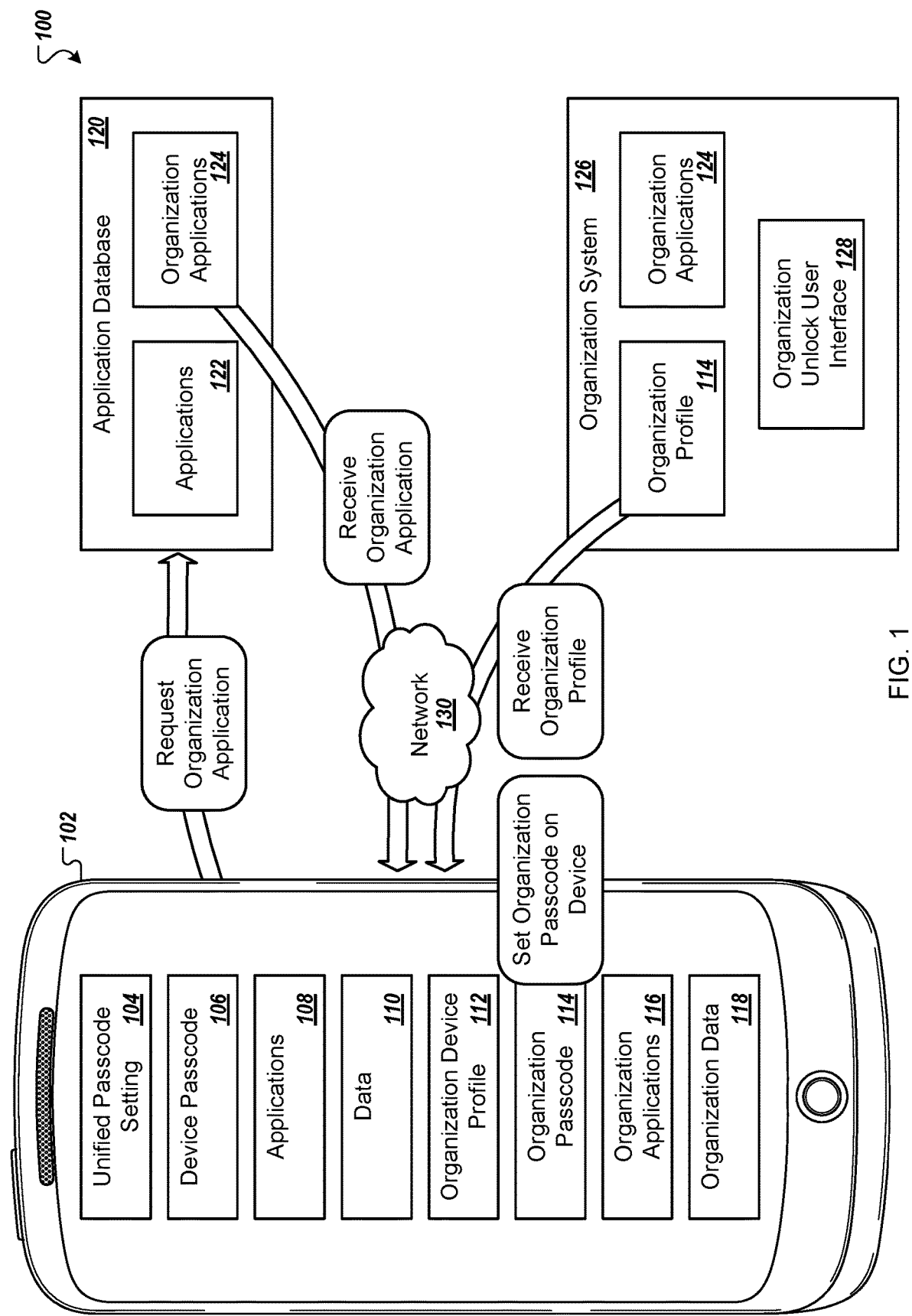
FIG. 1 is an example of an environment in which a computing device includes a user adjustable unified passcode setting.

This document generally describes electing whether to unify passcodes. Some computing devices (e.g., smartphones) allow users to specify a passcode to unlock the device and to access certain features of the device. For example, after a computing device has locked due to a time out or a user turning off the device, a user may have to specify a passcode such as "59823" to access the home screen of the computing device and to view a list of application programs that are available for use.

One or more of these application programs may have been developed by or on behalf of the user's employer, or may have been configured to access employer-provided data. Example such programs would involve an email program that is configured to access an email account provided by the employer, or an application program that allows the user to access a docketing system provided by the employer. The computing device may assign one or more of these "employer" application programs to a work profile, and all application programs assigned to the work profile may have to satisfy certain security criteria that can be specified by an administrator of the employer. For example, the administrator may specify that a user has to enter a passcode of a certain length before the user is able to access any of the employer application programs.

In some examples, the administrator-specified criteria may be more stringent than the criteria that the user has for their device-unlocking passcode, which may be used, for example, to access the home screen of the computing device. For example, the administrator may specify that a user has to enter a passcode that is eight-digits long in order to access the employer application programs, while the user may only enter a four-digit passcode to unlock their device. Some users may prefer this approach, because they are then able to use one passcode (possibly a rather simple one) to unlock their device, and only occasionally have to enter the other passcode (possibly much more complex) once the device is unlocked and when the user wants to access work content (e.g., to activate an email program that is configured to access work emails).

Entering two passwords regularly may be unwieldy for some users that access work-related content regularly. As such, the computing system may provide a setting that allows users to specify whether or not to provide two passcodes—one to unlock the device and one to access work content once unlocked—or just one password to access all device content. When the one-password setting is selected, that one password may have to meet the administrator-specified criteria, and thus unlocking the device may involve entry of a more-complex password.

The administrator at the employer may be able to specify various settings for accessing applications or data that are affiliated with the employer. The administrator may be able to specify the requirements for the passcode, which can include a length of the passcode, which types of passcodes are permissible (e.g., numeric only, alphanumeric, fingerprint, pattern unlock, etc.), may be able to specify how often the passcode has to be reset (e.g., every three months), and may be able to specify the number of failed attempts before the device erases data and/or applications that are on the device and that are associated with the employer.

For those instances in which users prefer to use one password to unlock the device and another to access the work-related content, the user of the device or the administrator may specify user interface features to differentiate between a passcode-entry screen for unlocking the device and a passcode-entry screen for accessing the work content. For example, the administrator may select different backgrounds (in color, displayed image, or text presented thereon) to be presented on each screen.

Again, in those instances in which users prefer to use one password to unlock the device and another to access the work-related content, the administrator may specify whether the user has to re-enter the work-related password for each work application program that the user tries to enter, or whether once the user has entered the work-related password, the user does not need to re-enter that password either until the device is locked or for a specified amount of time. In some examples, the user may only have to enter the work-related password once for a certain period of time (e.g., once per hour), even though the user may lock the device and have to re-enter the unlock passcode. For example, the user may enter the passcode to unlock the device, try to activate a first work-related application program (e.g., by selecting an icon for the application program), and be prompted to enter their work passcode. After successful entry, the user may elect to lock the device. Should the user then decide to access a second work-related application program, the user may have to enter their passcode to unlock the device, but may be able to activate the second work-related application program without re-entering the work passcode, should the user still be within a certain time period of entering the work passcode.

FIG. 1 is an example of an environment 100 in which a computing device 102 includes a user adjustable unified passcode setting 104 that specifies whether the computing device 102 has a single passcode to unlock the computing device 102 and access all applications or whether the computing device 102 has two passcodes, one which unlocks the computing device 102 and one which provides access to some of the applications installed on the computing device 102. For instance, the computing device 102 may include a device passcode 106 that can be used to unlock the computing device 102 and which provides access to one or more applications 108 and data 110 on the computing device 102.

When the computing device 102 transitions from a locked state to an unlocked state, due to user input that supplies the device passcode 106, the computing device 102 may present a home screen with a list of applications, including the applications 108. Upon receipt of a user selection of one of the applications 108, the computing device 102 provides access to some of the data 110 which corresponds to the selected application. For example, when the computing device 102 determines that an icon for a music player is selected, the computing device 102 provides access to songs included in the data 110.

One of the applications 108 may include an application database application which provides access to a remotelylocated application database 120 and installation data for applications. The computing device 102 may present a user interface for the application database application in response to user input specifying a user selection of an icon for the application database application. The user interface may present information about multiple applications 122 available from the application database 120 to allow a user to select an application to view more information about the selected application and to allow the user to cause the computing device 102 to download the selected application from the application database 20 and install the selected application.

The application database application may include information for an organization's applications 124 which are available from the application database 120, e.g., when the organization is an employer of the user or another entity with which the user is associated, such as a volunteer organization at which the user works. For instance, the application database application may receive user input specifying a particular one of the organization's applications 124, such as a docketing application for the organization, and present information about the particular one of the organization's applications 124 on a display of the computing device 102.

In response to user input received by the computing device 102 and specifying a request to install the docketing application, the application database application requests the docketing application from the application database 120 via a network 130. The computing device 102 receives, across the network 130, installation data for the docketing application and installs the docketing application, e.g., in a memory of the computing device 102.

The computing device 102 receives an organization device profile 112 for the organization to allow installation of the docketing application or to allow presentation of content using the docketing application. For instance, the computing device 102 requests the organization device profile 112 from an organization system 126 as part of an installation process for the docketing application. The computing device 102 receives the organization device profile 112 via the network 130 and installs the organization device profile 112 in a memory of the computing device 102.

Installation of the organization device profile 112 on the computing device 102 may cause the computing device to provide a user interface that requests user input specifying an organization passcode 114 for the computing device 102. The computing device 102 uses the organization passcode 114 to provide access to one or more organization applications 116, including the docketing application, and organization data 118.

For example, the computing device 102 may use the organization passcode 114 to encrypt data for the organization applications 116 and the organization data 118 both of which are stored on the computing device 102, e.g., in a memory of the computing device 102. When the computing device 102 receives a request to access one of the organization applications 116, such as the docketing application, the computing device 102 provides a user interface prompting user input of the organization passcode 114. Upon receipt of the organization passcode 114, the computing device 102 uses the organization passcode 114 (or another key that is associated with the organization device profile 112) to decrypt the organization applications 116 and the organization data 118. The computing device also then provides a user interface for the docketing application, e.g., launches the docketing application or causes presentation of a user interface for the docketing application when the docketing application is executing in the background.

The computing device 102 includes different user interfaces for receipt of the device passcode 106, e.g., used to unlock the computing device, and for receipt of the organization passcode 114. For instance, the computing device 102 may receive an organization unlock user interface 128 with the organization device profile 112, e.g., as part of the organization device profile 112 or separately. When the computing device 102 is locked and requires input of the device passcode 106, the computing device 102 presents a first user interface that is specific to the device passcode 106, e.g., so that a user may determine which passcode to enter in the first user interface. When the computing device 102 requires the organization passcode 114 to allow access to one of the organization applications 116, the computing device 102 presents the organization unlock user interface 128, e.g., so that the user may determine that the organization passcode 114 should be entered instead of the device passcode 106.

Figure 2B:
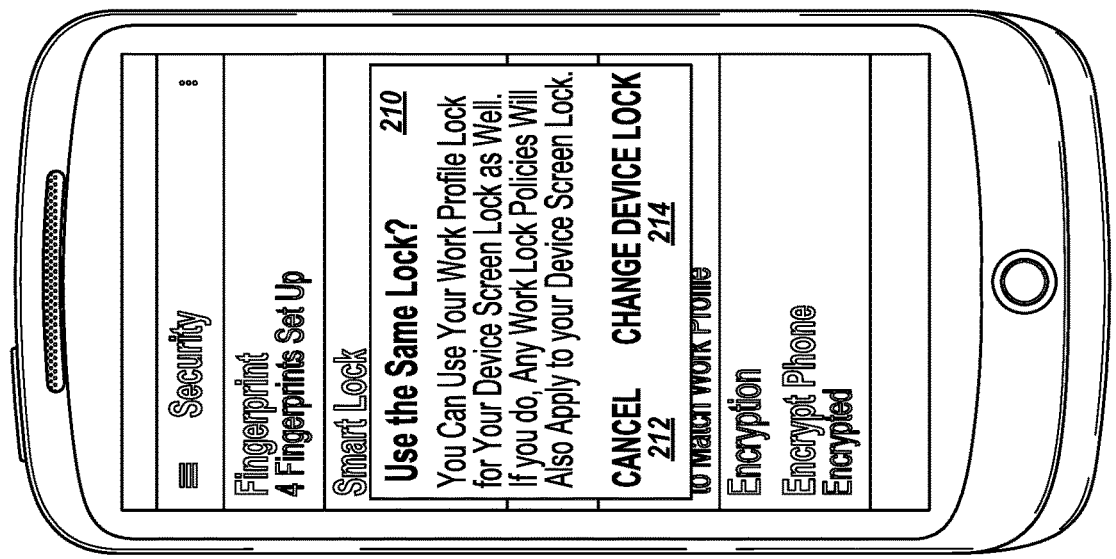
FIGS. 2A-E show example user interfaces for creating a unified passcode on a computing device.
Figure 2A:
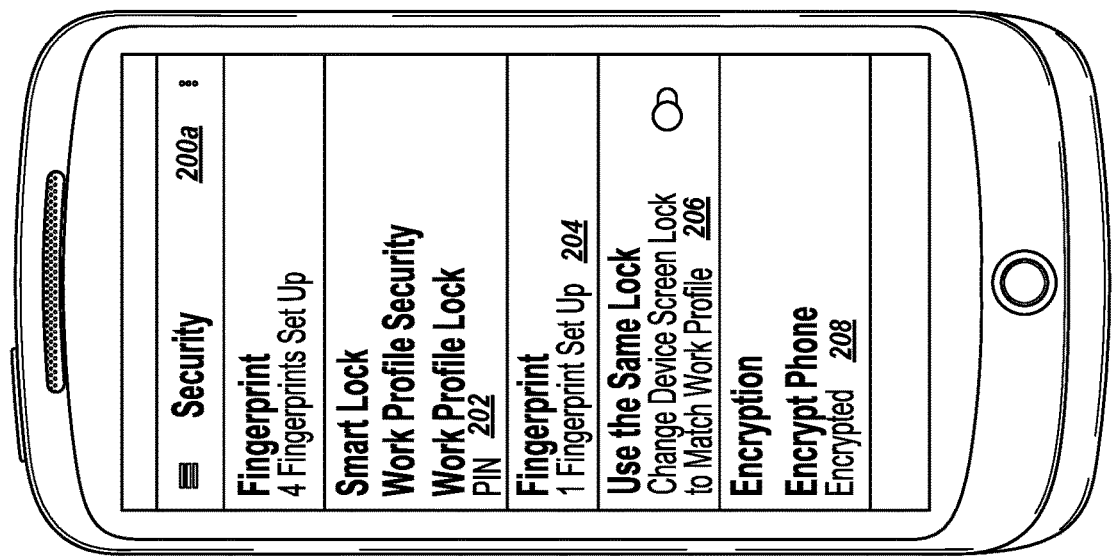

Upon installation of the organization device profile 112, or at any other appropriate time, the computing device 102 may present a menu for the unified passcode setting 104, such as a security setting user interface 200a shown in FIG. 2A. As previously discussed, this setting allows a user to specify whether the device should use a single password for both organization applications and unlocking the device, or two use separate passwords for these features. Examples of other appropriate times at which to present the menu for the unified passcode setting 104 include installation of one of the organization applications 116, launching of a newly installed organization application 116, when the organization passcode 114 is changed, when passcode restrictions for the organization passcode 114 change, periodically (e.g., every other month), or a combination of two or more of these. In some implementations, the computing device 102 creates a unified passcode for unlocking the computing device, e.g., for access to the applications 108, and the organization applications 116 upon installation of the organization device profile 112 and allows the creation of separate passcodes afterward.

FIGS. 2A-E show example user interfaces for creating a unified passcode on a computing device. For instance, the security settings user interface 200a shown in FIG. 2A includes information about the passcode requirements defined in the organization device profile 112, such a work profile lock setting 202 that specifies a passcode type that the computing device 102 requires to provide access to the organization applications 116, such as a PIN or a password. For example, the computing device 102 sets the work profile lock setting 202 based on a passcode type specified in the organization device profile 112.

A fingerprint setting 204 indicates whether the computing device 102 may provide access to the organization applications 116 upon receive of biometric data that matches a fingerprint profile stored on the computing device 102. The fingerprint setting 204 may indicate how many fingerprint profiles are stored on the computing device 102.

An encryption setting 208 indicates whether the organization applications 116 and the organization data 118 are encrypted. In some examples, the encryption setting 208 specifies whether all data on the computing device 102 is encrypted.

The security setting user interface 200a includes a unified passcode setting 206 that indicates whether the computing device 102 uses a single passcode for access to all content stored on the computing device 102 or multiple passcodes. For instance, when the unified passcode setting 206 is off, the computing device 102 stores, in a memory, data for both the device passcode 106 for unlocking the computing device 102 and the organization passcode 114 used for access to the organization applications 116.

When the computing device 102 receives user input indicating a selection of the unified passcode setting 206 from disabled to enabled, the computing device 102 presents a "use the same lock?" user interface 210 shown in FIG. 2B. The "use the same lock" user interface 210 may include information about using the organization passcode 114 to unlock the computing device 102 (e.g., about using a unified passcode), such as an indication that the organization device profile 112 applies to all applications on the computing device and not just the organization applications 116. The "use the same lock" user interface 210 may indicate that the device passcode 106 will no longer be used when a unified passcode is defined to be the unified passcode.

The "use the same" lock user interface 210 includes a cancel menu option 212 and an enable a unified passcode option 214. When the computing device 102 receives user input indicating selection of the cancel menu option 212, the computing device presents the security settings user interface 200a. When the computing device 102 receives user input indicating selection of the enable a unified passcode option 214, the computing device 102 presents user interfaces to confirm the current device passcode 106 and to confirm the organization passcode 114 before setting the unified passcode.

Figure 2D:
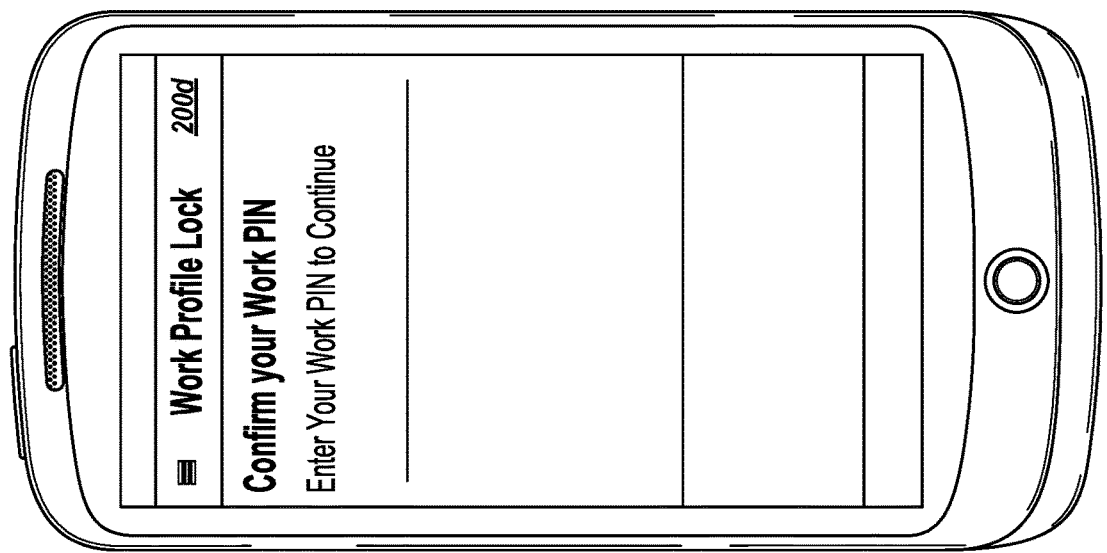
Figure 2C:
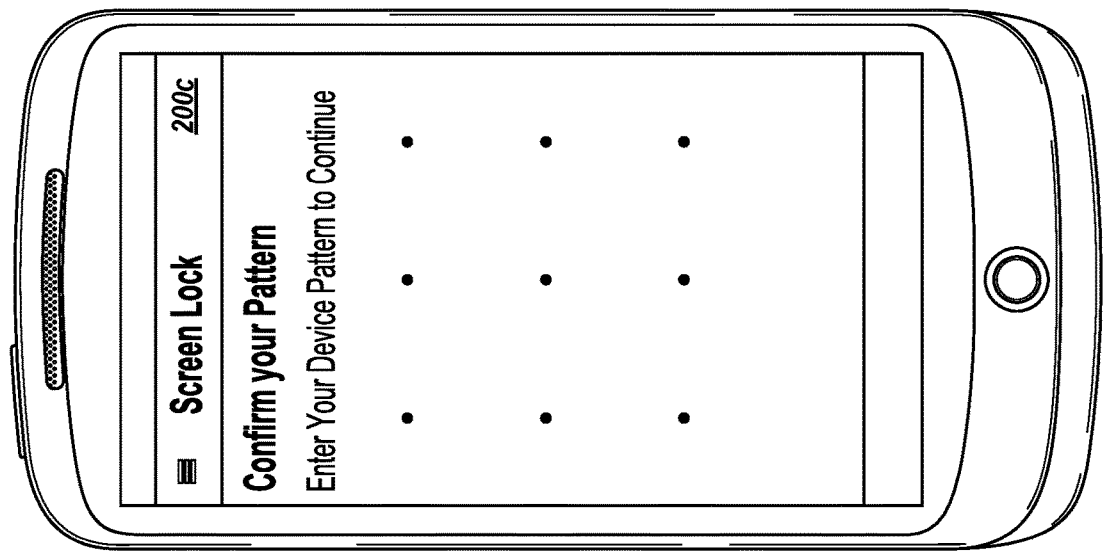
Figure 2E:
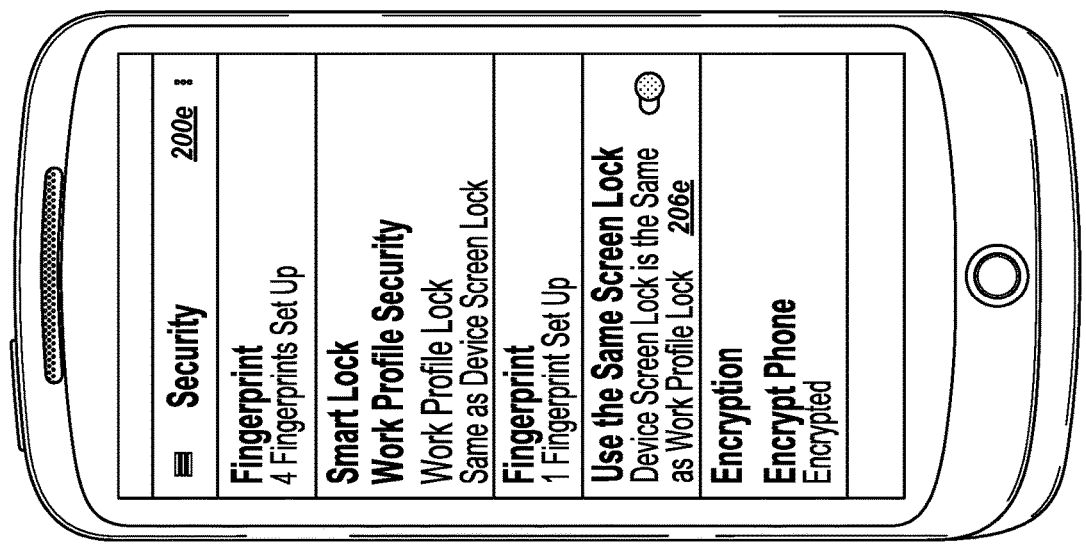

For instance, as shown in FIG. 2C, the computing device 102 may determine that the device passcode 106 is provided by pattern entry and therefore may present a pattern confirmation user interface 200c. A background for the pattern confirmation user interface 200c may be specific to the entry of the device passcode 106 (e.g., different from a background for the work passcode confirmation user interface shown in FIG. 2D). After the computing device 102 receives user input defining a pattern in the pattern confirmation user interface 200c (e.g., by the user tracing a finger between individual ones of the user interface elements in the grid on the display in a particular sequence), the computing device 102 determines whether the user input pattern matches the device passcode 106. If the user input pattern does not match the device passcode 106, the computing device 102 may present an error message, end the process of creating a unified passcode, or both.

When the computing device 102 determines that the user input pattern matches the device passcode 106, the computing device 102 may present a work passcode confirmation user interface 200d shown in FIG. 2D. A background for the work passcode confirmation user interface 200d may be specific to user input of the organization passcode 114 to distinguish the work passcode confirmation user interface 200d from the pattern confirmation user interface 200c. For example, the computing device 102 may determine that the organization passcode 114 is a PIN and, in the work passcode confirmation user interface 200d, request entry of a PIN to continue with the process to create a unified passcode. The user interfaces may also include different text. For example, the work passcode confirmation user interface 200d may state "Work profile lock" and refer to the "work PIN," while the pattern confirmation user interface 200c may refer to a "screen lock" and a "device pattern."

The computing device 102 determines whether the passcode entered in the work passcode confirmation user interface 200d is the same as the organization passcode 114. In response to determining that the passcodes are the same, the computing device 102 presents the security settings user interface 200e, shown in FIG. 2E, with an updated unified passcode setting 206e that indicates that the computing device 102 uses a unified passcode to unlock the computing device 102 and to provide access to the organization applications 116 and the organization data 118.

The computing device 102 may have different passcode restrictions for the device passcode 106 and the organization passcode 114. For instance, the computing device 102 may have a device policy that indicates that the device passcode 106 can be an unlock pattern, biometric data (e.g., fingerprint data or facial recognition data), or an alphanumeric passcode that is at least four characters (e.g., a password or a PIN). The organization device profile 112 may indicate that the organization passcode 114 can be biometric data, a six digit PIN, or an eight character password with both at least one letter and at least one number.

During the process to create a unified passcode, the computing device 102 may confirm that the organization passcode 114 complies with the passcode restrictions included in the organization device profile 112, e.g., when the passcode restrictions may have changed from a time at which the organization passcode 114 was initially set for the computing device 102. When the computing device 102 determines that the organization passcode 114 does not comply with the passcode restrictions included in the organization device profile 112, the computing device 102 presents another user interface requesting user input of a new organization passcode that complies with the passcode restrictions and uses the new organization passcode as the unified passcode.

If the computing device 102 receives user input indicating selection of the unified passcode setting 206e from the enabled to disabled position, the computing device 102 presents a user interface requesting confirmation of the unified passcode, e.g., similar to the work passcode confirmation user interface 200d of FIG. 2D. When the computing device 102 confirms that the user input for the confirmation matches the unified passcode, the computing device 102 uses the unified passcode as the organization passcode 114 and presents a user interface requesting a new device passcode 106.

Figure 3:
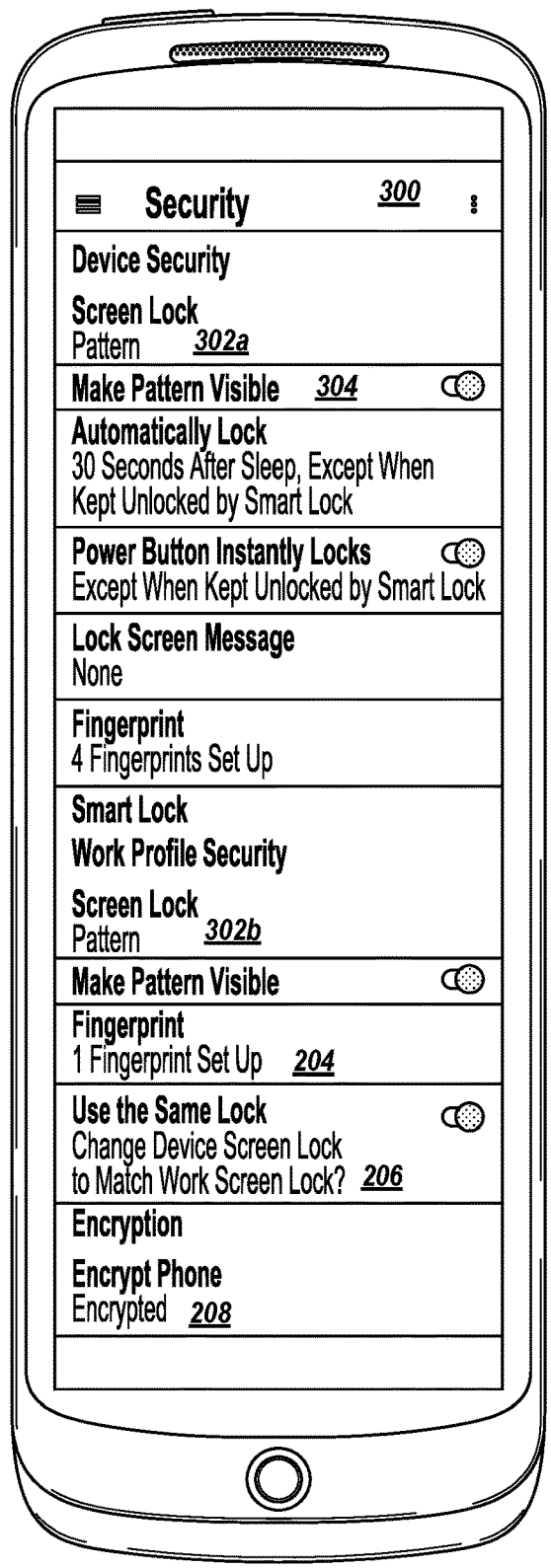
FIG. 3 is an example of a security setting user interface for a computing device.

FIG. 3 is an example of a security setting user interface 300 for a computing device. For example, the security setting user interface 200a may include a portion of the settings from, and be part of, the security setting user interface 300.

The security setting user interface 300 includes settings and information for both general security settings of the computing device 102 and, separately, work or organization profile security settings. For instance, the security setting user interface 300 includes a lock screen background option 302a which allows user input to specify a particular image or pattern to display on an unlock user interface, e.g., a user interface at which the computing device 102 receives input for the device passcode 106 when unlocking the computing device 102, a similar user interface to change the device passcode, or both.

A make pattern visible option 304 allows user input to indicate whether a pattern entered on a lock screen is displayed on the unlock user interface (e.g., by a user tracing a finger between individual ones of the user interface elements in a grid on the display in a particular sequence). For instance, when the make pattern visible option 304 is disabled, the computing device 102 does not present the pattern on the unlock user interface. When the make pattern visible option 304 is enabled, the computing device 102 presents, on the unlock user interface, the pattern created by user input on the unlock user interface.

A work lock screen background option 302b identifies a particular image or pattern the computing device 102 displays when prompting user input of the organization passcode 114, when prompting user input to change the organization passcode 114, or both. For instance, the work lock screen background option 302b may be specified in the organization device profile 112, e.g., by an administrator of the organization. The work lock screen background option 302b may identify an image, logo, or color for the organization.

The computing device 102 may not allow user modification of the work lock screen background option 302b. The computing device 102 changes the work lock screen background option 302b using data from the organization device profile 112 or other data from the organization system 126. In some implementations, the computing device 102 may allow user input to change the work lock screen background option 302b, e.g., when the organization device profile 112 indicates that a user may change the setting.

The unified passcode setting 206 in the security setting user interface 300 may indicate that the computing device 102 presents only one single lock screen background when requesting user input defining a passcode. The computing device 102 may use the work lock screen background 302b as the background for all lock screens when the unified passcode setting 206 is enabled. In some examples, the computing device 102 may use the lock screen background option 302a as the background for all lock screens to enable user input to define the background.

Returning to FIG. 1, the organization device profile 112 may include settings for the organization passcode 114, sessions during which the organization applications 116 and the organization data 118 are available, or both. For example, the organization device profile 112 may include an encryption setting that indicates how the organization applications 116, the organization data 118, or both, are encrypted and stored in a memory of the computing device 102.

The computing device 102 may include a setting that indicates that the computing device 102 must use a unified passcode when the computing device 102 has block-based encryption, e.g., because the computing device 102 is unable to encrypt the applications 108 and the data 110 separately from the organization applications 116 and the organization data 118. The setting may indicate that the computing device 102 may provide a user interface for user input selecting whether to use a unified passcode or separate passcodes to unlock the computing device 102 and access the organization applications 116 when the computing device 102 supports file-based encryption.

When the computing device 102 receives the organization device profile 112 and determines that the organization device profile 112 includes more restrictive passcode settings than those for the device passcode 106, the computing device 102 may determine whether the hardware of the computing device 102 supports only a unified passcode or both a unified passcode and separate passcodes. If the computing device 102 determines that only a unified passcode is supported, e.g., and the computing device 102 has block-based encryption, the computing device 102 provides a user interface requesting user input of a unified passcode for unlocking the computing device 102 and providing access to the organization applications 116.

When the computing device 102 determines that separate passcodes are supported, e.g., and the computing device 102 has file-based encryption, the computing device 102 may provide a user interface requesting user input specifying whether the computing device 102 should use a unified passcode or separate passcode. The user interface may include a menu option similar to the unified passcode setting 206 from FIG. 2A.

The computing device 102 receives user input specifying whether to use a unified passcode or separate passcodes. The computing device 102 may provide a second user interface requesting user input of the unified passcode, if a unified passcode was selected in the first user interface, or of the organization passcode 114, if separate passcodes were selected in the first user interface. The computing device 102 may use a setting in the organization device profile 112 to determine when to provide a user interface with a unified passcode option, when to provide a user interface requesting user input of the organization passcode, or both, e.g., in the same user interface or separate user interfaces.

The organization system 126 may receive administrator input specifying at least some of the settings included in the organization device profile 112. For instance, the organization system 126 may provide an administrator user interface for presentation to the administrator. The administrator may use the administrator user interface to specify a timeout for the organization passcode 114, a duration for which the organization passcode 114 is valid (e.g., after which a device requests user input specifying a new organization passcode), and the applications to which the organization device profile 112 applies (e.g., the applications to which the settings in the organization device profile 112 apply).

For example, the organization system 126 may receive administrator input via the administrator user interface specifying that the settings in the organization device profile 112 to apply to a docketing application, a mail application, and a calendar application. For instance, the administrator input indicates that the docketing application, the mail application, and the calendar application are the organization applications 124, e.g., applications developed by the organization or third party applications used to access data for the organization. When the computing device 102 receives a request to activate or install any of the organization applications 124, the computing device 102 determines whether the application to which the request applies is one of the organization applications and, if so, determines corresponding settings from the organization device profile 112 that apply to the application. These administrator-specified settings may apply and be transmitted to all or at least multiple devices at which organization applications are installed.

In one example, the computing device 102 may determine that a mail application includes settings for a first email account and that the first email account is not assigned to the organization device profile 112 because a domain for the first email account is not the same as a domain managed by the organization, e.g., the computing device 102 may determine that the first email account is a personal email account. When the computing device 102 receives user input for the mail application to setup a second email account, the computing device 102 determines that the second email account has a domain identified in the organization device profile 112 and is an email account managed by the organization.

The computing device 102 applies settings from the organization device profile 112 to the second email account. For instance, the computing device 102 encrypts data for the second email account using the organization passcode 114 and only allows access to the data for the second email account in response to user input of the organization passcode 114. In some examples, the computing device 102 may include two user interface elements for the mail application in a menu, e.g., on a home screen, a first user interface element for access to data for the first email account and a second user interface element for access to the second email account. The computing device 102 allows presentation of content for the first email account in response to user input specifying selection of the first user interface element without entry of the organization passcode 114 and requires entry of the organization passcode 114 upon receipt of user input specifying selection of the second user interface element, e.g., assuming that a session for access to the organization applications 116 is not currently active.

For instance, when the computing device 102 receives user input specifying the organization passcode 114, the computing device creates a session for access to the organization applications 116 and allows access to any of the organization applications 116 and the organization data 118 until the session ends. The duration of the session is specified by a timeout identified in the organization device profile 112. In some examples, the computing device 102 may extend the session while any one of the organization applications 116 is active, e.g., presented on a display, and begin a timer for the session when none of the organization applications 116 is active, e.g., when none of the organization applications have a user interface presented on the display. When the computing device 102 determines that a duration of the timer is the same as the timeout, the computing device 102 ends the session.

Figure 4:
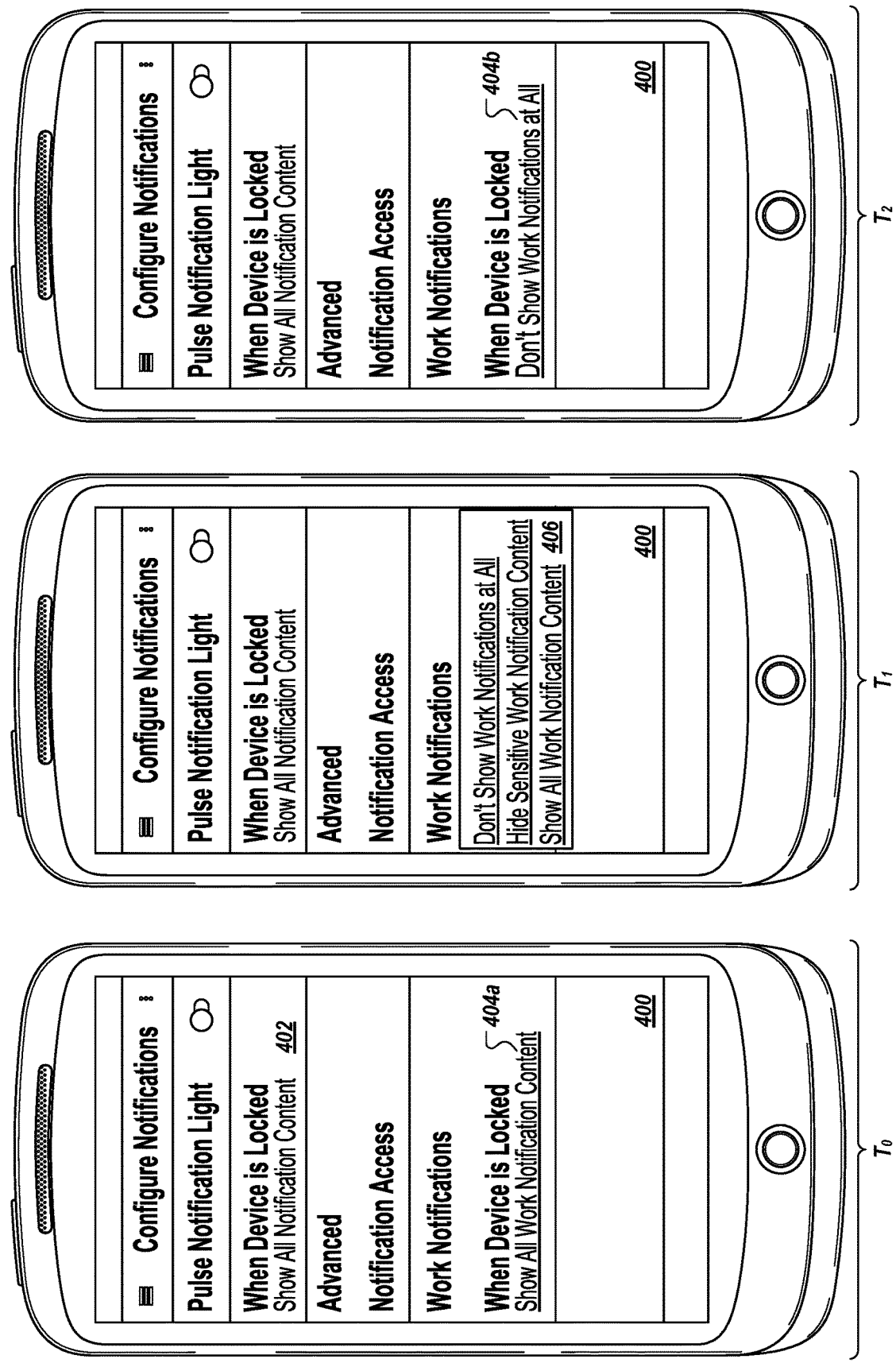
FIG. 4 is an example of a notification menu user interface.

The computing device 102 may include one or more settings that control presentation of notifications from the organization applications 116. The computing device 102 may present the settings in a notification menu user interface 400 shown in FIG. 4. The notification menu user interface 400 includes a locked notification setting 402 that specifies what type of notifications to present when the computing device 102 is locked. The computing device 102 uses the locked notification setting 402 for notifications from the applications 108 which are not assigned to the organization device profile 112.

The notification menu user interface 400 includes an organization locked notification setting 404a that specifies whether notifications from the organization applications 116 are presented when the computing device 102 is locked. For instance, at time $T_0$, the organization locked notification setting 404a is set to "show all work notification content". When any of the organization applications 116 determines a notification, e.g., such as an email notification, the computing device 102 receives data for the notification and causes the presentation of the notification on a locked screen using the data.

The notification menu user interface 400 receives a selection of the organization locked notification setting 404a-b and, at time $T_1$, presents a notification menu 406. The notification menu 406 includes a "don't show work notifications" option, a "hide sensitive work notification content" option, and a "show all work notification content" option. When the "hide sensitive work notification content" option is set, the computing device 102 prevents presentation of sensitive work content on a locked screen. For instance, the organization device profile 112 may indicate that sensitive work content includes contact names and email bodies. When the computing device 102 receives a notification from a mail application for an organization email and the "hide sensitive work notification content" option is set, the computing device 102 may presents, using data from the organization device profile 112, a subject of the email, a notification that a work email has been received, or a notification that a message has been received, e.g., without identifying the organization application that determined the message.

The notification menu user interface 400 receives user input specifying selection of the "don't show work notifications" option and, at time $T_2$, presents an updated organization locked notification setting 404b that indicates that the computing device 102 should not display notifications for any of the organization applications 116 while the computing device 102 is locked. In some implementations, the computing device 102 may provide an alert, e.g., audible, that the computing device 102 has a notification without any visible indication of details for the notification. The computing device 102 may receive user input for unlocking the computing device 102 and provide information about the organization notifications once the computing device 102 is unlocked.

In some implementations, the organization locked notification setting 404a-b may be specified by an administrator. For instance, the organization device profile 112 may include data indicating that the organization locked notification setting 404b should be set to "don't show work notifications" and cannot be changed in response to user input.

Returning to FIG. 1, the organization device profile 112 may include additional settings for the computing device which are specified by an administrator, e.g., of the organization. For instance, the organization device profile 112 may indicate which types of passcodes may be used for the organization passcode (e.g., numeric only, alphanumeric, biometric, pattern unlock, etc.), a minimum length for a passcode (e.g., whether numeric, alphanumeric, or a pattern unlock), a number of failed attempts before the computing device 102 prevents access to the organization applications 116 and the organization data 118 (e.g., before data for the organization applications 116 and the organization data 118 are removed from all memories of the computing device 102), or a combination of two or more of these.

The organization device profile 112 may identify, as a background for an unlock user interface requesting user input of the organization passcode 114, the organization unlock user interface 128. The organization unlock user interface 128 may be an image, e.g., logo, for an organization, a color for the organization, e.g., blue, or may include a name of the organization, e.g., for presentation in the unlock user interface such as at the top of the interface, or a combination of two or more of these. The computing device 102 may use the organization unlock user interface 128 when prompting user input to change the organization passcode 114. The organization system 126 may receive administrator input specifying one or more of the settings in the organization device profile 112 before providing the organization device profile 112 to the computing device.

In some examples, the computing device 102 may receive the organization device profile 112 from the organization system 126 and determine which organization applications are available to the computing device 102 using the organization device profile 112. The computing device 102 may receive the organization device profile 112 during setup of one of the organization applications 116 on the computing device, such as an email account in an email application, in response to a request for the organization device profile 112, or using any other appropriate method.

The computing device 102 may receive one or more of the organization applications 116 from the application database 120, e.g., using the application database application, from the organization system 126, from another computer that includes the organization applications 124, or a combination of two or more of these. For example, the computing device 102 may receive data to setup an email account on the computing device 102 from the organization system 126, e.g., when the computing device 102 uses a preinstalled email application for the email account. The computing device 102 may receive a calendar application from the application database 120 and a docketing application from a server managed by the organization.

In some implementations, the organization device profile 112 may include a setting that specifies that when the computing device 102 has separate passcodes and receives biometric data to unlock the computing device 102, the computing device 102 may provide access to the organization applications 116, assuming the computing device 102 validates the biometric data to ensure that the biometric data matches stored biometric data for the organization passcode 114. For instance, the computing device 102 may present an unlock screen user interface and receive biometric data in response. The computing device 102 uses the biometric data to confirm that the biometric data matches biometric data for the device passcode 106 and matches biometric data for the organization passcode 114. When the computing device 102 determines that the received biometric data matches biometric data for both the device passcode 106 and the organization passcode 114, the computing device 102 provides access to the organization applications 116, e.g., begins a session in which access to the organization applications 116 is allowed.

When the computing device 102 determines that the received biometric data only matches biometric data for the device passcode 106, the computing device 102 unlocks and does not provide access to the organization applications 116, e.g., the computing device 102 provides a user interface for user input of the organization passcode 114 before activating any of the organization applications 116. When the computing device 102 determines that the received biometric data does not match any stored biometric data, the computing device 102 may provide a user interface requesting re-entry of a passcode.

In some examples, the computing device 102 may allow entry of the organization passcode 114 from a lock screen. For example, the computing device 102 may include two different unlock user interfaces, each identified with a different background as discussed above. The computing device 102 may present a first unlock user interface for user input specifying the device passcode 106 in response to a first user input on a lock screen of the computing device 102, e.g., a swipe from the left of the lock screen to the right of the lock screen. The computing device 102 may present a second unlock user interface for user input specifying the organization passcode 114 in response to a second, different user input on the lock screen, e.g., a swipe from the right of the lock screen to the left of the lock screen.

When the computing device 102 receives user input specifying the organization passcode 114 in the second user interface while the computing device 102 is locked, the computing device 102 provides access to the organization applications 116 and the organization data 118 and not the applications 108 or the data 110. If the computing device 102 receives a request for activation of one of the applications 108 or for access to the data 110, the computing device 102 provides a user interface for user input of the device passcode 106.

In some examples, when the computing device 102 presents notifications for the organization applications 116 on a lock screen and, in response, receives user input selecting a notification for one of the organization applications 116, the computing device 102 provides an unlock user interface requesting user input specifying the organization passcode 114. The computing device 102 confirms that user input received by the unlock user interface matches the organization passcode 114 and provides access to data for the notification for the one of the organization applications 116.

Alternatively, the computing device 102 may provide an unlock user interface requesting user input specifying the device passcode 106 in response to receipt of user input selecting the notification for one of the organization applications. When the computing device 102 confirms that the device passcode 106 has been entered in the unlock user interface, the computing device 102 provides a passcode user interface requesting second user input specifying the organization passcode 114. The computing device 102 confirms that second user input received by the passcode user interface matches the organization passcode 114 and provides access to data for the notification for the one of the organization applications 116.

When the computing device 102 has separate passcodes, e.g., the unified passcode setting 104 is disabled, the computing device 102 does not apply any settings from the organization device profile 112 to the applications 108 or the data 110. For instance, the computing device 102 does not allow the organization or an administrator of the organization to control any applications or data that are not assigned to the organization device profile 112 and only allows the organization or an administrator of the organization to control the organization applications 116 installed on the computing device 102 and the organization data 118 stored on the computing device 102.

In some implementations, when the computing device 102 does not have a unified passcode, the computing device 102 may have the organization passcode 114 and not have the device passcode 106, e.g., the device passcode 106 may be disabled. For example, the computing device 102 may not require a passcode to unlock the computing device 102 while requiring the organization passcode 114 to access any of the organization applications 116.

The computing device 102 may include personal computers, mobile communication devices, and other devices that can send and receive data over the network 130. The network 130, such as a local area network (LAN), wide area network (WAN), the Internet, or a combination thereof, connects the computing device 102, the application database 120, and the organization system 126.

Figure 5:
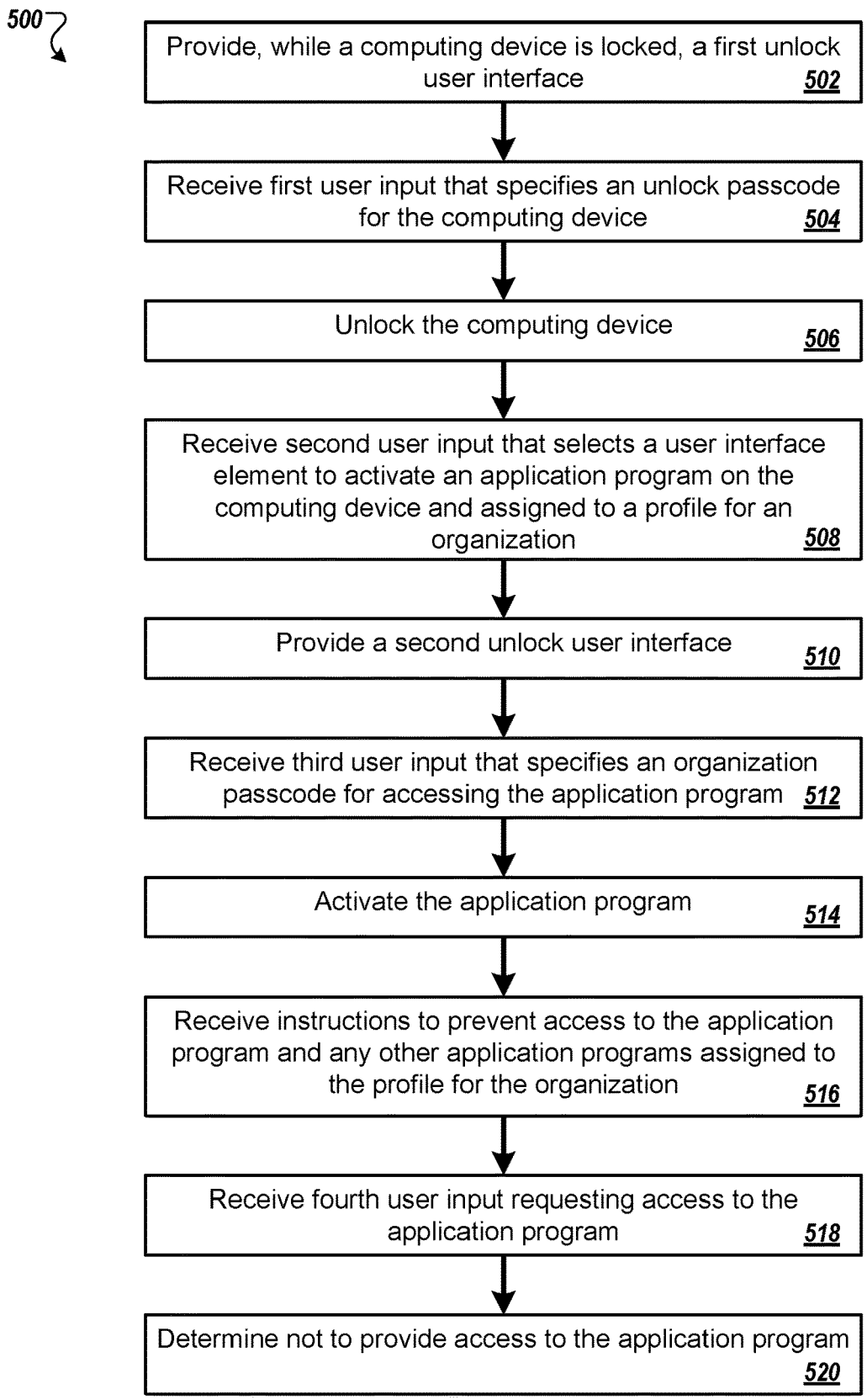
FIG. 5 is a flow diagram of a process for activating an organization application.

FIG. 5 is a flow diagram of a process 500 for activating an organization application. For example, the process 500 can be used by the computing device 102 from the environment 100.

A computing device provides, while the computing device is locked, a first unlock user interface (502). For example, the first unlock user interface requests user input of a device passcode to unlock the computing device. The first unlock user interface may include a first background, e.g., that is not specific to an organization.

The computing device receives first user input that specifies an unlock passcode for the computing device (504). The computing device compares the first user input with data for the device passcode to determine whether the first user input is an approved device passcode, e.g., approved password or biometric data.

The computing device unlocks (506). Upon determining that the first user input is an approved device passcode, the computing device unlocks and provides access to one or more device applications which are not managed by an organization device profile of an organization.

The computing device receives second user input that selects a user interface element to activate an application program installed on the computing device and assigned to a profile for an organization (508). For instance, the computing device receives second user input that identifies an icon presented on a home screen of the computing device. The computing device determines that the icon is for the application program and that the second user input is a request to active the application program.

The computing device provides a second unlock user interface, the second unlock user interface being a different user interface than the first unlock user interface (510). The second unlock user interface may include a second background that is specific to the organization. For example, the first lock user interface may have a generic background color and the second lock user interface may include an image, e.g., logo, for the organization. The background of the second unlock user interface facilitates recognition of the second unlock user interface as a request for an organization passcode on the computing device.

The computing device receives third user input that specifies an organization passcode for accessing the application program (512). The computing device compares the third user input with the organization passcode to determine whether to allow access to the application program, e.g., one of the organization applications, such as a docketing application.

The computing device activates the application program (514). In response to determining that the third user input is an approved organization passcode, the computing device activates the application program. The computing device may launch the docketing program if the docketing program is not already running. The computing device may cause presentation of a user interface for the docketing program, e.g., when the docketing program is running in the background and not presented on a display for the computing device.

The computing device receives instructions to prevent access to the application program and any other application programs assigned to the profile for the organization (516). The instructions may be received in response to a predetermined quantity of failed attempts to enter an organization passcode for access to the application program or in response to administrator input to prevent access to the application program. For instance, the computing device receives the instructions from a computer managed by the organization to prevent any access to the organization's applications and organizational data when the computer receives administrator input indicating that access to the application should be prevented. The computing device may determine that the instructions indicate that data and applications for the organization should be removed from the computing device.

When the computing device has separate passcodes, the computing device does not apply the instructions to applications or data not assigned to an organization device profile. For instance, the instructions do not apply to the applications 108 or the data 110 described above with reference to FIG. 1.

When the computing device has a single unified passcode, the computing device applies the instructions to all applications and data on the device. For instance, the computing device does not allow unlocking of the computing device, the computing device restores itself to factory conditions by removing all applications and data stored on the device after installation of an operating system on the computing device, or both.

The computing device receives fourth user input requesting access to the application program (518). For example, when the computing device does not remove data for the applications for the organization from a memory of the computing device, the computing device may receive user input specifying selection of the user interface element to activate the application program, e.g., presented on the home screen of the computing device.

The computing device determines not to provide access to the application program in response to receiving the instructions to prevent access to the application program and any other application programs assigned to the profile for the organization (520). The computing device determines that instructions were received that indicate that access to the application program and other application programs for the organization should not be allowed and does not activate the application program.

In some implementations, the process 500 can include additional steps, fewer steps, or some of the steps can be divided into multiple steps. For example, the computing device may perform steps 502 through 514 or step 516 (alone) without performing the other steps of the process 500. In some implementations, the process 500 may include one or more steps from the process 600 described in more detail below.

Figure 6:
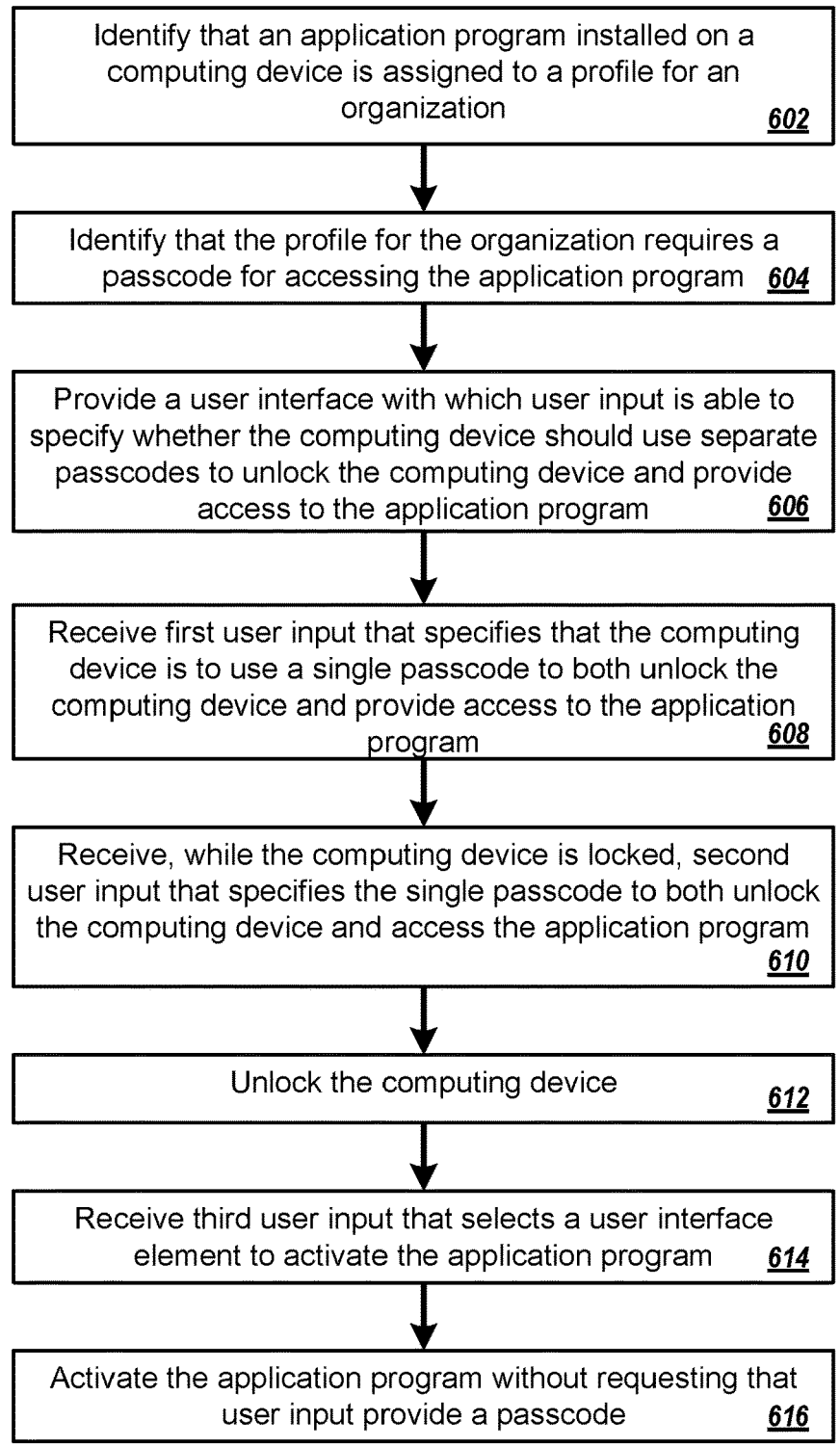
FIG. 6 is a flow diagram of a process for setting a unified passcode.

FIG. 6 is a flow diagram of a process 600 for setting a unified passcode. For example, the process 600 can be used by the computing device 102 from the environment 100.

A computing device identifies that an application program installed on the computing device is assigned to a profile for an organization (602). For instance, the application program may be a newly installed application or an application that was previously installed. The computing device may determine that the application program has not yet been executed and identify the application program as assigned to the profile for the organization in response to a request to execute the application.

The computing device identifies that the profile for the organization requires a passcode for accessing the application program (604). For example, the computing device determines that the organization profile specifies that a passcode is required to access any programs or data for the organization, such as a docketing application of the organization and data representing projects and deadlines.

The computing device provides a user interface with which user input is able to specify whether the computing device should use separate passcodes for unlocking the computing device and accessing the application program (606). The computing device may provide the user interface in response to identifying that the profile for the organization requires a passcode for accessing the application.

In some examples, the computing device presents the security setting user interface 200*a* described in more detail above. The computing device may initially create a unified passcode, e.g., a single passcode to unlock the computing device and access applications for the organization, and then provide the user interface for receipt of user input specifying whether the computing device should use separate passcodes for unlocking the computing device and accessing the applications for the organization.

In some implementations, the computing device may determine whether the computing device supports multiple passcodes. For example, the computing device may determine whether the hardware of the computing device supports file-based encryption or block-based encryption. In response to determining that the computing device supports file-based encryption, e.g., that a memory of the computing device supports file-based encryption, the computing device provides the user interface. In response to determining that the computing device supports block-based encryption, the computing device take no further action, e.g., and stops performing steps in the process 600.

The computing device receives first user input that specifies that the computing device is to use a single passcode to both unlock the computing device and access the application program (608). For instance, the computing device receives the first user input via the security setting user interface 200*a*. The computing device may provide one or more additional user interfaces confirming the selection of the single passcode to both unlock the computing device and access the application program.

The computing device receives, while the computing device is locked, second user input that specifies the single passcode to both unlock the computing device and access the application program (610). For example, the computing device provides a lock screen and a menu option to cause presentation of an unlock screen. The computing device receives user input specifying selection of the menu option and, in response, provides an unlock screen user interface, e.g., presents the unlock screen user interface on a display of the computing device. The computing device receives the second user input in response to presentation of the unlock screen user interface. The computing device validates the second user input to confirm that the second user input is a valid passcode for the computing device.

The computing device unlocks (612). For instance, the computing device unlocks in response to receipt and validation of the single passcode.

The computing device receives third user input that selects a user interface element to activate the application program (614). For example, after unlocking, the computing device provides a home screen user interface that includes icons for applications installed on the computing device including the docketing application. The computing device receives the third user input that specifies selection of an icon for the docketing application.

The computing device activates the application program without requesting that user input provide a passcode (616). For instance, the computing device causes the application program, e.g., the docketing application, to present a user interface for the application program without requiring user input of an organization passcode between the receipt of the third user input that selects the user interface element to active the application program and the application program presenting the user interface.

The order of steps in the process 600 described above is illustrative only, and the setting of the unified passcode can be performed in different orders. For example, the computing device may identify that the profile for the organization requires a passcode for accessing application programs and provide the user interface with which user input is able to specify whether the computing device should use separate passcodes prior to identifying that the application program is installed, e.g., prior to installation of the application program on the computing device.

In some implementations, the process 600 can include additional steps, fewer steps, or some of the steps can be divided into multiple steps. For example, the computing device may perform steps 602 through 608 or steps 604 through 608 without performing the other steps in the process 600.

Figure 7:
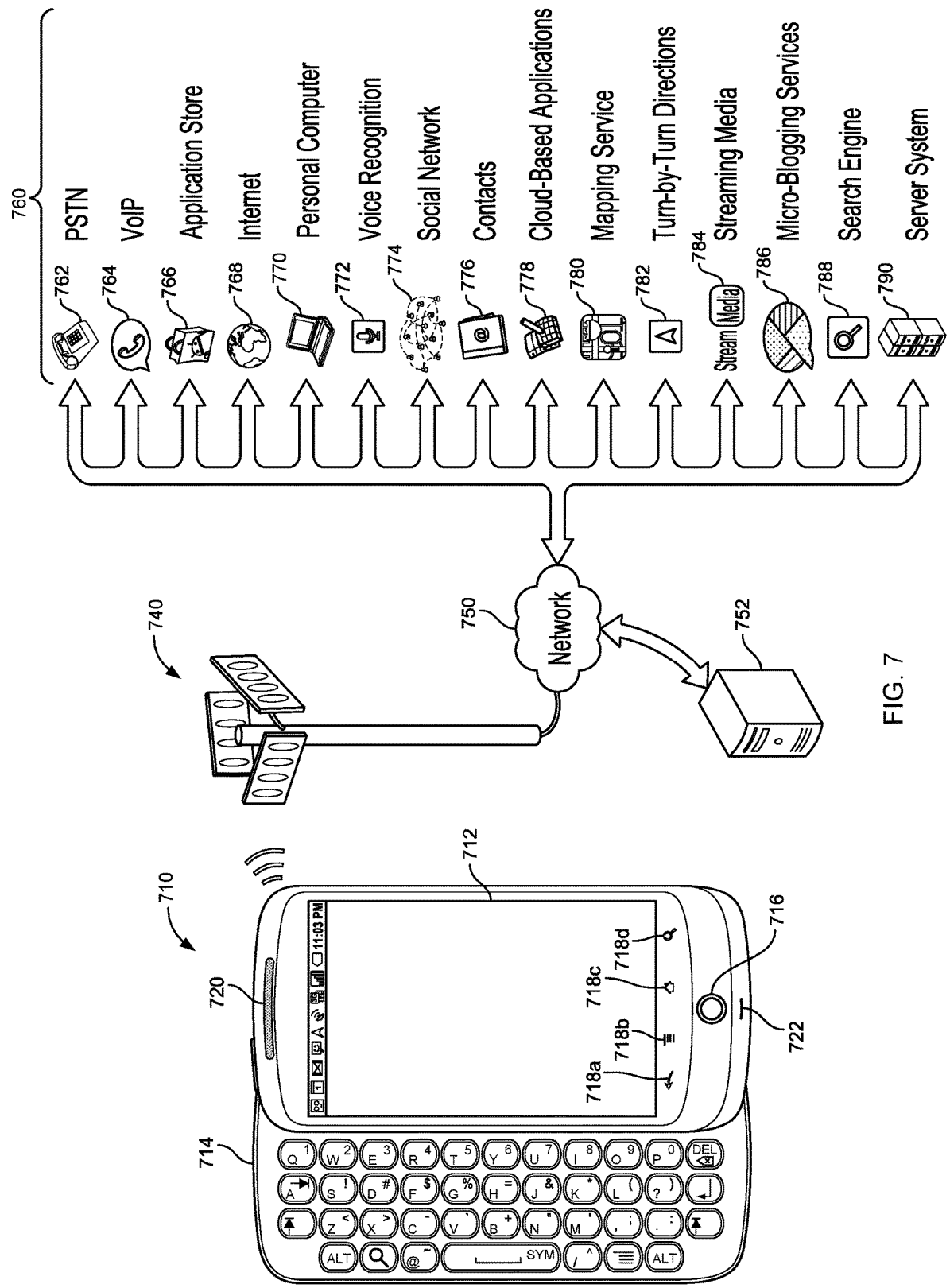
FIG. 7 is a conceptual diagram of a system that may be used to implement the systems and methods described in this document.

Referring now to FIG. 7, a conceptual diagram of a system that may be used to implement the systems and methods described in this document is illustrated. In the system, mobile computing device 710 can wirelessly communicate with base station 740, which can provide the mobile computing device wireless access to numerous hosted services 760 through a network 750.

In this illustration, the mobile computing device 710 is depicted as a handheld mobile telephone (e.g., a smartphone, or an application telephone) that includes a touchscreen display device 712 for presenting content to a user of the mobile computing device 710 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 714, physical buttons, trackballs, accelerometers, gyroscopes, and magnetometers).

Example visual output mechanism in the form of display device 712 may take the form of a display with resistive or capacitive touch capabilities. The display device may be for displaying video, graphics, images, and text, and for coordinating user touch input locations with the location of displayed information so that the device 710 can associate user contact at a location of a displayed item with the item. The mobile computing device 710 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 714, which may be a full qwerty keyboard or a traditional keypad that includes keys for the digits '0-9', '*', and '#.' The keyboard 714 receives input when a user physically contacts or depresses a keyboard key. User manipulation of a trackball 716 or interaction with a track pad enables the user to supply directional and rate of movement information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718*a-d*. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 704. User-selection of the button may invoke the pre-defined action.

In some examples, the operating system provides a "desktop" graphical user interface that is displayed after turning on the mobile computing device 710, after activating the mobile computing device 710 from a sleep state, after "unlocking" the mobile computing device 710, or after receiving user-selection of the "home" button 718*c*. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 710 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 710 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 710 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 710. The mobile device 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., ETHERNET, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computing systems that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing systems associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call using a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers. An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user-input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 8:
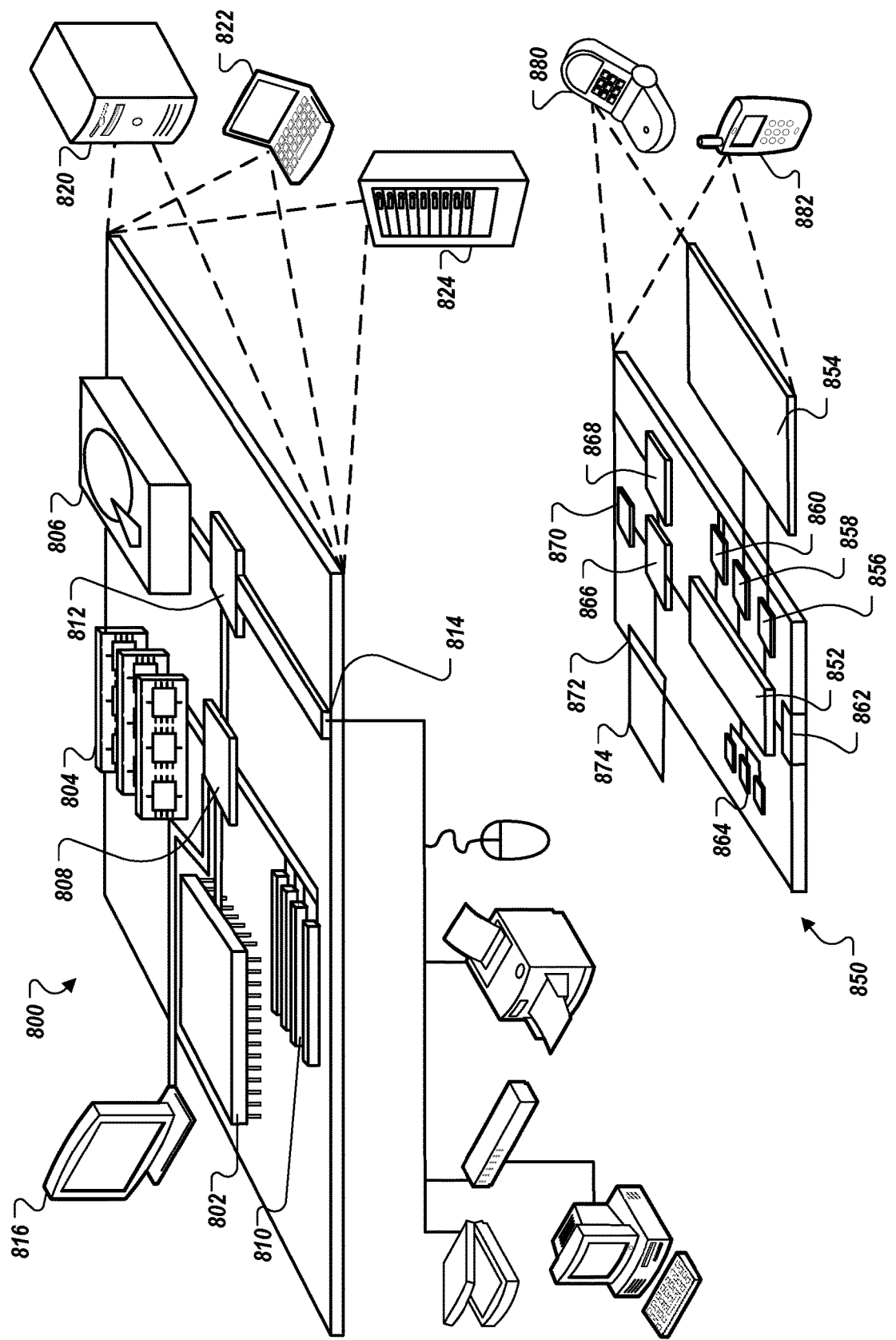
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may be provided, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    receiving, by a computing device that is in a locked state, user input that enters a first passcode to unlock the computing device and, as a result of the computing device determining that the first passcode is valid to unlock the computing device, transitioning the computing device from the locked state to an unlocked state;

receiving, by the computing device while the computing device is in the unlocked state, user input that selects a user interface element to activate an application program;

requesting, by the computing device, user entry of a passcode to access the application program, responsive to the computing device having received the user input that selects the user interface element to activate the application program and the computing device identifying that a passcode is required to access the application program;

receiving, by the computing device, user input that enters a second passcode to access the application program and, as a result of the computing device determining that the second passcode is valid to access the application program, providing access to the application program, wherein the second passcode is a separate passcode that is different from the first passcode;

receiving, by the computing device, user input that interacts with a unified passcode interface element to switch the computing device from (i) using separate passcodes for unlocking the computing device and providing access to the application program to (ii) using a single passcode to both unlock the computing device and provide access to the application program;

increasing, by the computing device, security requirements for passcodes permissible to unlock the computing device, as a result of receiving the user input that interacted with the unified passcode user interface element to switch the computing device from using separate passcodes to using a single passcode for unlocking the computing device and providing access to the application program, wherein the first passcode does not satisfy the increased security requirements for passcodes permissible to unlock the computing device;

requesting, by the computing device, user entry of a new passcode that satisfies the increased security requirements for passcodes permissible to unlock the computing device, and receiving in response user input that defines a third passcode, wherein the third passcode does satisfy the increased security requirements for passcodes permissible to unlock the computing device;

transitioning the computing device from the unlocked state to the locked state;

receiving, by the computing device while the computing device is in the locked state and after the user input has interacted with the unified passcode user interface element to switch the computing device from using separate passcodes to using a single passcode for unlocking the computing device and providing access to the application program, user input that specifies the third passcode to unlock the computing device and, as a result of determining that the third passcode is valid for unlocking the computing device, transitioning the computing device from the unlocked state to the locked state; and receiving, by the computing device after the computing device has transitioned from the locked state to the unlocked state, user input that selects the user interface element to activate the application program and, as a result of having determined that the third passcode that was input while the computing device was in the locked state is valid for activating the application program, activating the application program without requesting that user input provide a passcode to access the application program while the computing device is in the unlocked state, as a result of the user input having interacted with the unified passcode user interface element to switch the computing device from using separate passcodes to using a single passcode for unlocking the computing device and providing access to the application program.

2. The computer-implemented method of claim 1, wherein the increased security requirements include an increased length of passcodes permissible to unlock the computing device, such that security requirements for the third passcode require a longer length passcode than security requirements for the first passcode.

3. The computer-implemented method of claim 1, wherein the increased security requirements include fewer types of passcodes being acceptable for the third passcode from among a collection of types of passcodes acceptable for the first passcode.

4. The computer-implemented method of claim 3, wherein the collection of types of passcodes includes (i) numeric only passcodes, (ii) alphanumeric passcodes, and (iii) pattern unlock passcodes.

5. The computer-implemented method of claim 1, further comprising:
preventing, by the computing device, access to the application program, until receipt of user input that specifies:
(i) the second passcode, before the computing device received the user input that interacted with the unified passcode user interface element to switch the computing device from using separate passcodes to using a single passcode for unlocking the computing device and providing access to the application program, and
(ii) the third passcode, after the computing device received the user input that interacted with the unified passcode user interface element to switch the computing device from using separate passcodes to using a single passcode for unlocking the computing device and providing access to the application program.

6. The computer-implemented method of claim 1, wherein:
the first passcode was specified through user interaction with an unlocking user interface;
the second passcode was specified through user interaction with an application-authentication user interface; and
the unlocking user interface is different from the application-authentication user interface.

7. A system comprising:
one or more computer-readable devices having instructions stored thereon, that when executed by one or more processors, cause the one or more processors to perform operations comprising:
receiving, by a computing device that is in a locked state, user input that enters a first passcode to unlock the computing device and, as a result of the computing device determining that the first passcode is valid to unlock the computing device, transitioning the computing device from the locked state to an unlocked state;

receiving, by the computing device while the computing device is in the unlocked state, user input that selects a user interface element to activate an application program;

requesting, by the computing device, user entry of a passcode to access the application program, responsive to the computing device having received the user input that selects the user interface element to activate the application program and the computing device identifying that a passcode is required to access the application program;

receiving, by the computing device, user input that enters a second passcode to access the application program and, as a result of the computing device determining that the second passcode is valid to access the application program, providing access to the application program, wherein the second passcode is a separate passcode that is different from the first passcode;

receiving, by the computing device, user input that interacts with a unified passcode interface element to switch the computing device from (i) using separate passcodes for unlocking the computing device and providing access to the application program to (ii) using a single passcode to both unlock the computing device and provide access to the application program;

increasing, by the computing device, security requirements for passcodes permissible to unlock the computing device, as a result of receiving the user input that interacted with the unified passcode user interface element to switch the computing device from using separate passcodes to using a single passcode for unlocking the computing device and providing access to the application program, wherein the first passcode does not satisfy the increased security requirements for passcodes permissible to unlock the computing device;

requesting, by the computing device, user entry of a new passcode that satisfies the increased security requirements for passcodes permissible to unlock the computing device, and receiving in response user input that defines a third passcode, wherein the third passcode does satisfy the increased security requirements for passcodes permissible to unlock the computing device;

transitioning the computing device from the unlocked state to the locked state;

receiving, by the computing device while the computing device is in the locked state and after the user input has interacted with the unified passcode user interface element to switch the computing device from using separate passcodes to using a single passcode for unlocking the computing device and providing access to the application program, user input that specifies the third passcode to unlock the computing device and, as a result of determining that the third passcode is valid for unlocking the computing device, transitioning the computing device from the unlocked state to the locked state; and receiving, by the computing device after the computing device has transitioned from the locked state to the unlocked state, user input that selects the user interface element to activate the application program and, as a result of having determined that the third passcode that was input while the computing device was in the locked state is valid for activating the application program, activating the application program without requesting that user input provide a passcode to access the application program while the computing device is in the unlocked state, as a result of the user input having interacted with the unified passcode user interface element to switch the computing device from using separate passcodes to using a single passcode for unlocking the computing device and providing access to the application program.

8. The system of claim 7, wherein the increased security requirements include an increased length of passcodes permissible to unlock the computing device, such that security requirements for the third passcode require a longer length passcode than security requirements for the first passcode.

9. The system of claim 7, wherein the increased security requirements include fewer types of passcodes being acceptable for the third passcode from among a collection of types of passcodes acceptable for the first passcode.

10. The system of claim 9, wherein the collection of types of passcodes includes (i) numeric only passcodes, (ii) alphanumeric passcodes, and (iii) pattern unlock passcodes.

11. The system of claim 7, wherein the operations further comprise:
preventing, by the computing device, access to the application program, until receipt of user input that specifies:
(i) the second passcode, before the computing device received the user input that interacted with the unified passcode user interface element to switch the computing device from using separate passcodes to using a single passcode for unlocking the computing device and providing access to the application program, and
(ii) the third passcode, after the computing device received the user input that interacted with the unified passcode user interface element to switch the computing device from using separate passcodes to using a single passcode for unlocking the computing device and providing access to the application program.

12. The system of claim 7, wherein:
the first passcode was specified through user interaction with an unlocking user interface;
the second passcode was specified through user interaction with an application-authentication user interface; and
the unlocking user interface is different from the application-authentication user interface.

13. The system of claim 7, wherein:
the computing device requests the user entry of the passcode to access the application program responsive to the computing device identifying that the application program is assigned to a profile for an organization that requires a passcode to access the application program; and
the computing device is configured to, upon receipt of the user input that interacts with the unified passcode interface element, switch the computing device to using the single passcode to both unlock the computing device and provide access to all application programs assigned to the profile for the organization, including the application program.

14. The computer-implemented method of claim 1, wherein:
the computing device requests the user entry of the passcode to access the application program responsive to the computing device identifying that the application program is assigned to a profile for an organization that requires a passcode to access the application program; and the computing device is configured to, upon receipt of the user input that interacts with the unified passcode interface element, switch the computing device to using the single passcode to both unlock the computing device and provide access to all application programs assigned to the profile for the organization, including the application program.

15. The system of claim 13, wherein:

the first passcode was specified through user interaction with an unlocking user interface;

the second passcode was specified through user interaction with an application-authentication user interface;

the unlocking user interface is different from the application-authentication user interface; and the application-authentication user interface includes an image that is specified by the organization or an administrator of the organization.

16. The computer-implemented method of claim 14, wherein:

the first passcode was specified through user interaction with an unlocking user interface; the second passcode was specified through user interaction with an application-authentication user interface;

the unlocking user interface is different from the application-authentication user interface; and the application-authentication user interface in an image that is specified by the organization or an administrator of the organization.

* * * * *

UNITED STATES PATENT AND TRADEMARK OFFICE
CERTIFICATE OF CORRECTION

PATENT NO. : 10,530,762 B2
APPLICATION NO. : 15/156415
DATED : January 7, 2020
INVENTOR(S) : Green et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 193 days.

Signed and Sealed this
Twenty-fifth Day of August, 2020

Andrei Iancu
*Director of the United States Patent and Trademark Office*